(12) United States Patent
Ubidia et al.

(10) Patent No.: US 8,511,196 B2
(45) Date of Patent: Aug. 20, 2013

(54) TRACTION DRIVE SYSTEM

(75) Inventors: Fernando A. Ubidia, Ludlow, MA (US);
Aaron M. Stein, Middletown, CT (US);
John Lewis, Monson, MA (US)

(73) Assignee: Tandem Technologies, LLC, Ludlow, MA (US)

( * ) Notice: Subject to any disclaimer, the term of this patent is extended or adjusted under 35 U.S.C. 154(b) by 581 days.

(21) Appl. No.: 12/766,823

(22) Filed: Apr. 23, 2010

(65) Prior Publication Data

US 2010/0273602 A1 Oct. 28, 2010

Related U.S. Application Data

(60) Provisional application No. 61/172,110, filed on Apr. 23, 2009.

(51) Int. Cl.
*F16H 13/08* (2006.01)

(52) U.S. Cl.
USPC ............ 74/490.03; 475/196; 476/36; 901/25

(58) Field of Classification Search
USPC ..... 74/490.03, 490.05; 475/196; 476/36–38; 901/25
See application file for complete search history.

(56) References Cited

U.S. PATENT DOCUMENTS

| | | | |
|---|---|---|---|
| RE18,175 E * | 9/1931 | Erban | 475/195 |
| 2,655,242 A | 10/1953 | Chalfin et al. | |
| 2,840,270 A | 6/1958 | Gore | |
| 3,226,833 A | 1/1966 | Lemelson | |
| 3,227,005 A * | 1/1966 | Johnson | 475/196 |
| 3,391,265 A | 7/1968 | Esche | |
| 3,523,707 A | 8/1970 | Roth | |
| 3,743,340 A | 7/1973 | Williamann | |
| 3,800,932 A | 4/1974 | Dana | |
| 4,351,518 A | 9/1982 | Stievenart | |
| 4,427,192 A | 1/1984 | Kushmaul et al. | |
| 4,494,743 A | 1/1985 | Kushmaul et al. | |
| 4,557,659 A | 12/1985 | Scaglia | |
| 4,673,876 A * | 6/1987 | Paulsen | 324/207.21 |
| 4,850,627 A | 7/1989 | Franklin | |
| 4,951,517 A * | 8/1990 | Azuma et al. | 476/65 |
| 5,240,139 A | 8/1993 | Chirnomas | |
| 5,267,483 A | 12/1993 | Torii et al. | |
| 5,292,029 A | 3/1994 | Pearson | |
| 5,397,279 A * | 3/1995 | McCotter, Jr. | 475/196 |

(Continued)

FOREIGN PATENT DOCUMENTS

| | | | |
|---|---|---|---|
| DE | 2455673 A1 | 5/1976 | |
| FR | 2597239 A1 | 10/1987 | |

(Continued)

*Primary Examiner* — William C Joyce
(74) *Attorney, Agent, or Firm* — Matthew De Preter, Esq.; Rockey & Lyons

(57) ABSTRACT

A traction drive system for an articulated robotic arm. The traction drive system can include an input drive disk, a spider, an array of traction balls, a traction plate, an output drive shaft, a clamping device to load the traction balls, and an absolute rotation position sensor system. The rotation of the output drive shaft can be coupled to the rotation of the input drive disk while the traction balls are frictionally engaged to the drive disk surface and traction plate surface. The rotational connection can be decoupled when the traction balls are not frictionally engaged to the drive disk surface and traction plate surface. A rotational position sensor located in proximity to the traction drive can provide absolute rotational position feedback of the output drive shaft.

22 Claims, 5 Drawing Sheets

(56) References Cited

U.S. PATENT DOCUMENTS

| | | |
|---|---|---|
| 5,425,645 A | 6/1995 | Skovdal et al. |
| 5,513,116 A | 4/1996 | Buckley et al. |
| 5,513,772 A | 5/1996 | Glaser |
| 5,561,604 A | 10/1996 | Buckley et al. |
| 5,571,258 A | 11/1996 | Pearson |
| RE35,743 E | 3/1998 | Pearson |
| 5,787,825 A | 8/1998 | Yaji et al. |
| 5,957,326 A | 9/1999 | Ostgaard |
| 5,971,205 A | 10/1999 | Michaels et al. |
| 5,988,717 A | 11/1999 | Foust |
| 6,003,286 A | 12/1999 | Goodman |
| 6,186,358 B1 | 2/2001 | Peteraf |
| 6,253,955 B1 | 7/2001 | Bower |
| 6,345,850 B1 | 2/2002 | Foust |
| 6,547,096 B1 | 4/2003 | Chirnomas |
| 6,623,236 B1 | 9/2003 | Barnes |
| 6,786,355 B2 | 9/2004 | Chirnomas |
| 6,868,983 B2 | 3/2005 | Chirnomas |
| 6,881,025 B2 | 4/2005 | Illingworth et al. |
| 7,044,330 B2 | 5/2006 | Chirnomas |
| 7,044,332 B2 | 5/2006 | Giegerich et al. |
| 7,222,901 B2 | 5/2007 | Gebauer et al. |
| 7,240,805 B2 | 7/2007 | Chirnomas |
| 2003/0234259 A1 | 12/2003 | Selfridge et al. |
| 2004/0079761 A1 | 4/2004 | Chirnomas |
| 2007/0043469 A1 | 2/2007 | Draper |
| 2008/0093371 A1 | 4/2008 | Ubidia et al. |
| 2009/0243600 A1 * | 10/2009 | Itomi .................. 324/207.25 |

FOREIGN PATENT DOCUMENTS

| | | | |
|---|---|---|---|
| JP | 8-135748 | * | 5/1996 |
| JP | 2003-324930 | * | 11/2003 |
| JP | 2005-274176 | * | 10/2005 |
| WO | WO 99/12132 A1 | | 3/1999 |
| WO | WO 2004/114233 A1 | | 12/2004 |
| WO | WO 2008/137355 A1 | | 11/2008 |

* cited by examiner

TRACTION DRIVE SYSTEM

CROSS-REFERENCE TO RELATED APPLICATIONS

This patent application claims the benefit of U.S. Provisional Patent Application No. 61/172,110, filed Apr. 23, 2009, which is incorporated by reference in its entirety herein.

BACKGROUND

Previously, robotic arms for vending machine applications and the like did not provide a mechanism to allow robotic arm members to move independently from the motor driving the arm member. The movement of arm members of prior art are permanently coupled to their respective driving motors. Therefore, if the movement of the arm member halts due to a collision or jam, or is abruptly reversed, damage to drivetrain components or the motor providing power to the arm is possible. Manual movement of the robotic arm members may also damage the drivetrain components or the motor.

Personal safety is also a concern because there is no mechanism to disengage the movement of the robotic arm member from the motor, and the motor will continue to drive the motion of the robotic arm member while power is provided to the motor.

Furthermore, previous robotic arms utilize non-absolute position encoders to provide position feedback to the vending machine control. The vending machine controller monitors robotic arm position by keeping count of encoder pulses. If any encoder pulses are lost, due to electrical noise, for instance, the position accuracy of the arm is reduced.

BRIEF SUMMARY OF THE DISCLOSURE

The present disclosure relates to a novel drive system for the segments of an articulated robotic arm used in vending equipment, consumer product delivery systems, and the like.

According to one embodiment, a traction drive system for an articulated robotic arm is provided. The traction drive system can include an input drive disk, a spider, an array of traction balls, a traction plate, an output drive shaft, and a clamping device to load the traction balls. The traction drive system can be assembled at one end of an articulated robot arm segment where said segment joins with another arm segment of the articulated robotic arm, or separate traction systems may be assembled at each end of an articulated robotic arm segment to join multiple arm segments. A motor can provide power to the input drive disk by means of a drive belt. Power is transmitted through the traction drive system to the output drive shaft. The output drive shaft may be fixed to the adjoining robot arm segment, providing motion to the adjoining arm segment as the output drive shaft rotates, or providing motion to the arm segment with the traction drive system if the adjoining arm segment is immobile.

The traction drive system can function in the following manner: the array of traction balls can be loaded between the input drive disk and traction plate with a clamping device; in some embodiments the traction plate can be fixed rotationally with respect to the input drive disc, traction balls, spider, and output drive shaft; as the input drive disk is rotated, the array of traction balls can roll in a circular path on both the surface of the input drive disk and the surface of the traction plate; the traction balls may be sufficiently constrained to prevent deviation from the circular path; since the traction plate can be rotationally fixed, the array of traction balls can rotate in the same direction as the drive pulley at a lower resultant speed, such as ½ the speed of the input drive disk; the traction balls can contact the spokes of the spider and transfer their circular motion to the spider; the spider can be fixed to the output drive shaft and, therefore, the spider rotation can be transmitted directly to the output drive shaft; the resulting output shaft speed can be lower than the input drive disk speed, such as ½ the input drive disk speed. In other embodiments, the output drive shaft can be fixed rotationally with respect to the input drive disc and traction plate.

If the frictional forces between the traction balls, the input drive disk, and traction plate are greater than the tangential forces acting on the traction balls due to torque applied to the input drive disk, the traction balls will continue to roll in the circular path and maintain a coupled rotation between the input drive disk and the output drive shaft, or a coordinated rotation between the input drive disk and the traction plate.

If the torque applied to the input drive disk causes the tangential forces acting on the traction balls to overcome the frictional forces, the traction balls will slip along the surface of the input drive disk and traction plate, and the rotations of the input drive disk and the output drive shaft (or between the input drive disk and the traction plate) are decoupled.

The frictional forces acting on the traction balls can be set by the clamping device loading the traction balls.

Further, an absolute rotational position sensor system can be provided. The absolute rotational position sensor system can include a permanent magnet embedded in the output drive shaft, an electronic circuit board with a magnetically sensitive electronic component, and a mounting bracket that locates the electronic circuit board in proximity to the permanent magnet.

The permanent magnet embedded in the output drive shaft can be rotationally fixed to the output drive shaft. As the output drive shaft rotates, the embedded magnet can rotate. Alternatively, as the bracket rotates, the magnetically sensitive electronic component can rotate. The radial orientation of the magnetic field may be detected by the magnetically sensitive electronic component. The magnetically sensitive component can encode the orientation of the magnetic field into absolute rotational position data, and the data can be sent to the vending machine controller.

The mounting bracket can position the electronic circuit board and the magnetically sensitive electronic component concentrically to an embossment feature on the bracket. The embossment feature on the bracket can engage the end of the output drive shaft to appropriately locate the magnetically sensitive electronic component in proximity to the permanent magnet embedded in the output drive shaft.

One feature of the novel traction drive system is that it can act as an overload or safety clutch. The controllable and predictable slippage reduces the risk of damage to the drivetrain components and motor. If, for example, the output drive shaft's rotational motion seizes or is abruptly reversed, the slippage would prevent damage to the powertrain components coupled to the input drive disk. Similarly, the traction drive allows the output shaft or an arm segment carrying the traction drive to be manually rotated without risk of damage to the drive components. In addition, the slippage also provides a safety feature to reduce the potential for injury to objects that may come into contact with the arm.

For example, when the traction drive system is used for an articulated robotic arm, the arm may be manually positioned without risk of damaging the traction drive components or other powertrain components. Therefore, the arm may be manually moved by a technician during servicing without disassembling powertrain components, or the arm can be manipulated for programming purposes by manually positioning the arm to a specific location without control intervention (lead-by-the-nose programming).

The traction drive system can provide a reduction in backlash over traditional gear and belt drive systems. The traction drive is inherently backlash free, and because of the manner in which the traction balls transmit rotational motion, it can have an inherent 2:1 reduction ratio.

The absolute rotational position sensor system can provide true absolute position feedback of an articulated robotic arm. The absolute position feedback allows high precision movement of an articulated robotic arm. Additionally, the absolute rotational position sensor system can allow a robotic arm to be programmed for single position calibration. For example, a program with a number of predefined positions can be loaded into a controller, such as a vending machine controller, and by orienting the robotic arm to single calibration position, the robotic arm can be automatically programmed to all predefined locations.

DETAILED DESCRIPTION OF THE INVENTION

Figure 1:
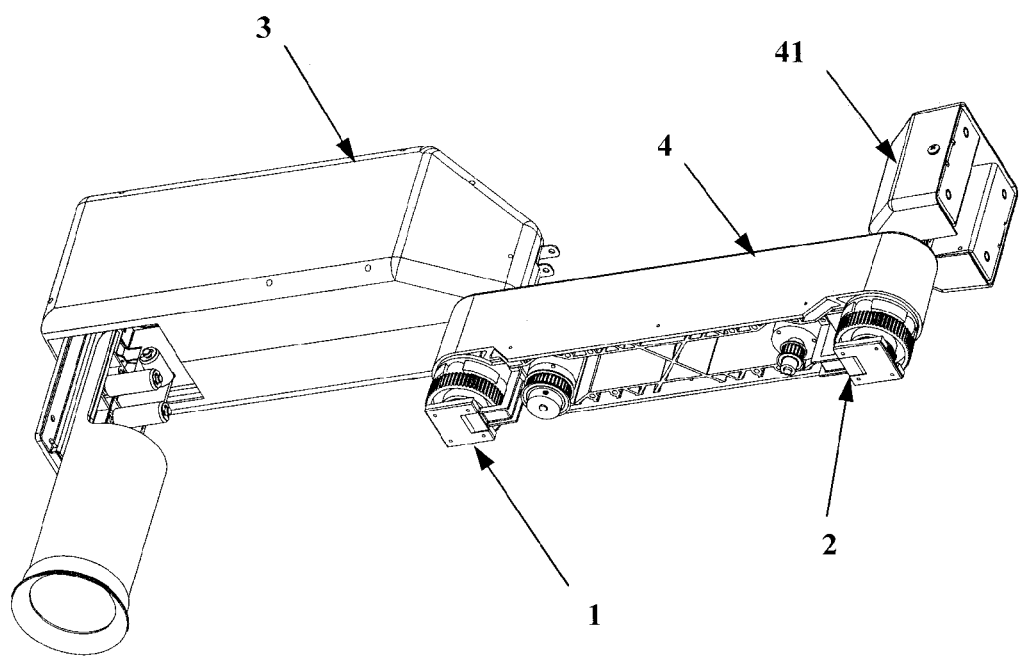
FIG. 1 is a perspective view of two traction drives applied to an articulated robotic arm.

Referring to FIG. 1, the utilization of two traction drive systems 1 and 2 are shown in an articulated robotic arm. The first traction drive system 1 is assembled in an arm segment 4 and directly rotates arm segment 3 relative to arm segment 4. The second traction drive system 2 is assembled to arm segment 4 and rotates arm segment 4 relative to arm segment 41, which can be a fixed base feature of the articulated robotic arm. It will be appreciated that any suitable number of traction drive systems may be applied to an articulated robotic arm to move any suitable number of arm segments in any suitable directions.

Figure 2:
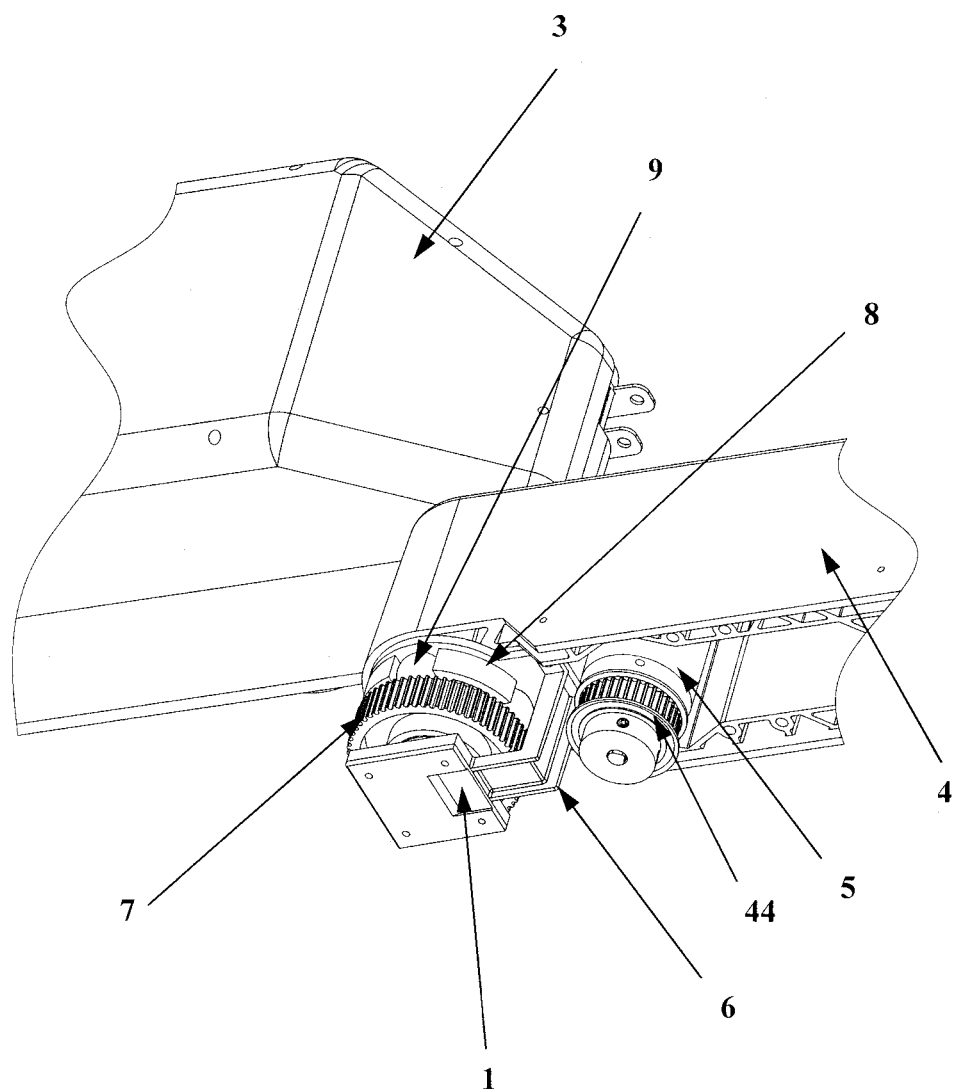
FIG. 2 is an enlarged perspective view of a traction drive such as is shown in FIG. 1.

Referring to FIG. 2, the traction drive system 1 is shown at the joint of two articulated robotic arm segments. The traction drive system 1 is assembled to arm segment 4 and provides rotational motion to arm segment 3 relative to arm segment 4. As shown, the traction drive system 1 can include an input drive disk 7, a spider 8, and traction balls 9. A mounting bracket 6 may be used to hold an electronic circuit board, as described further herein. The input drive disk 7 can be coupled via a drive belt to a pulley 44 of a motor 5, which can be used to rotate the input drive disk 7.

Figure 3:
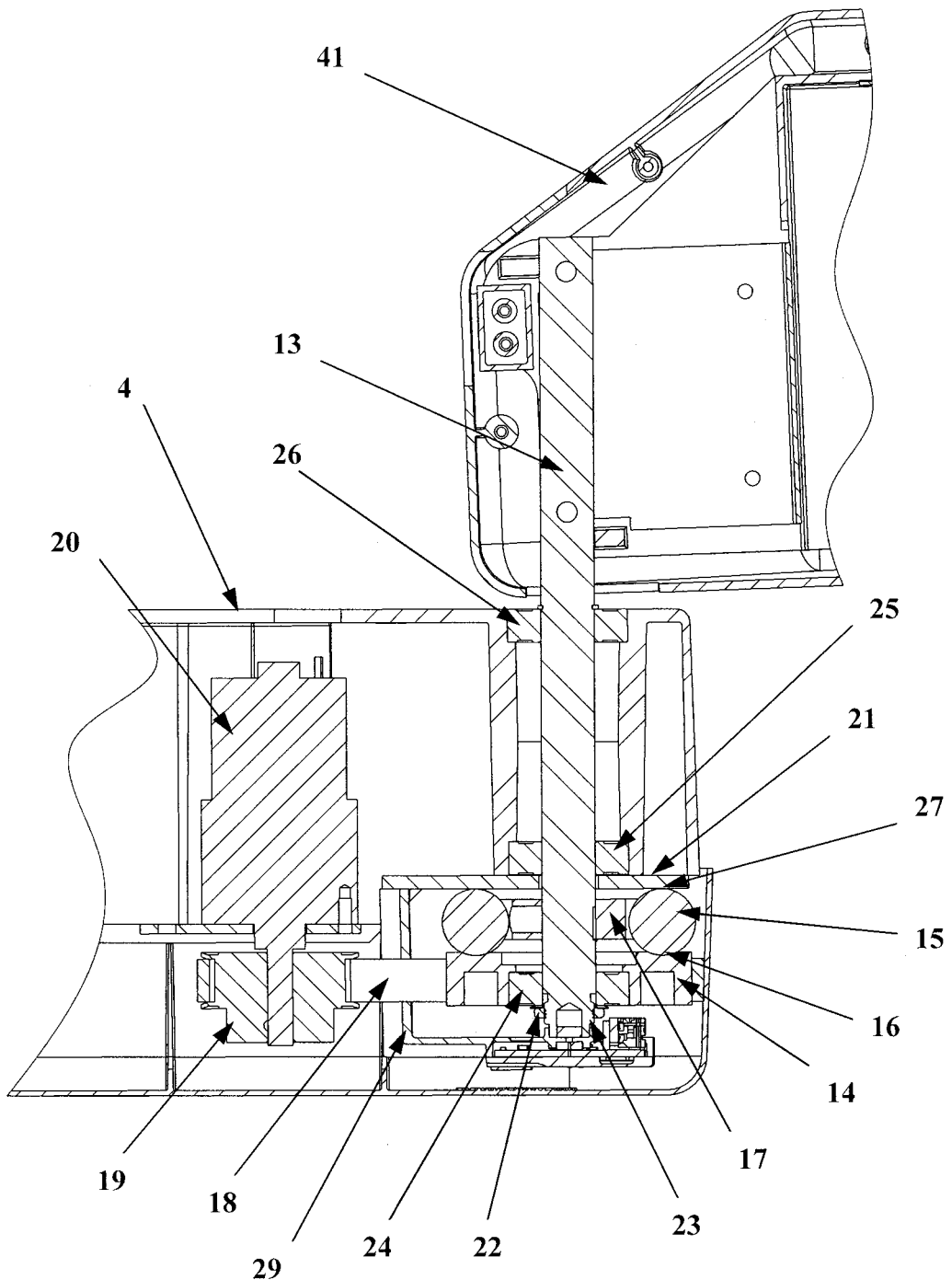
FIG. 3 is a simplified sectional view of a traction drive such as is shown in FIG. 1.

Referring to FIG. 3, the traction drive system 2 is shown, which is shown as structurally similar to the traction drive system 1 shown in FIG. 2. Thus, it will be appreciated that the detailed discussion of traction drive system that follows can be applicable to either of the traction drive systems 1 or 2 shown in the figures, although it will further be appreciated that when utilized with an articulated robotic arm, relative movements of certain components of the traction drive system relative to one another may depend on which arm segment the traction drive is located and whether an adjacent arm segment is fixed (such as to a wall) or not. Thus, for purposes of the discussion that follows with respect to FIGS. 3-5B, the operation of the traction arm is discussed considering that the arm segment 41 could either be movable or fixed.

As shown, the traction drive system 2 is assembled to robotic arm segment 4. The traction balls 15 and spider 17 can be assembled between the input drive disk 14 and traction plate 21 and contact the surfaces of the input drive disk at 16 and the traction plate at 27. The traction balls 15 may be located between the spokes of the spider 17. The output drive shaft 13 extends coaxially through the input drive disk 14, the spider 17, and the traction plate 21. The traction plate 21 can be fixed to the robotic arm segment 4. The spider 17 can be fixed to the output drive shaft 13.

The output drive shaft 13 can be supported by ball bearing assemblies mounted to the robotic arm segment 4 at 25 and 26, and a ball bearing assembly can also be mounted in the center of the input drive disk 14 at 24. A fastener such as a nut 22 can be threaded to the bottom of the output drive shaft 13 near an end 23 and can be used as a clamping device to load the traction balls 15 and secure the traction drive assembly 2 together, i.e., the nut 22 loads the input drive disk 14 and ball bearing assembly 24 against the traction balls 15, and the traction balls 15 are in turn loaded against the traction plate 21.

The input drive disk 14 can be coupled to a motor 20 by a drive belt 18 and pulley 19. As the input drive disk 14 rotates, friction between the traction balls 15 and the input drive disk 14 and traction plate 21 can cause the traction balls 15 to roll along the surface of the traction plate 21 and a surface of the input drive disk 14. The input drive disk 14 can include a circular slot 16 that constrains the traction balls 15 to a circular path as they roll. As the traction balls 15 roll in the circular path, the traction balls 15 contact the spider 17 and can transfer the circular motion to the spider 17. The spider 17 can be fixed to output drive shaft 13. As the spider 17 rotates, the output drive shaft 13 can rotate, and can rotate at a reduced speed such as ½ the input drive disk speed. The output drive shaft is fixed to arm segment 41, which could move the arm segment 41 as the output drive shaft 13 rotates. In embodiments where the arm segment 41 is fixed, the output drive shaft 13 can be fixed to the arm segment 41 and the traction balls 15 can rotate the traction plate 21 to move arm segment 4.

As mentioned, the nut 22 exerts a force on the input drive disk 14. This load applies a normal force to the traction balls 15 at the points of contact of the input drive disk 14 at 16 and the traction plate 21 at 27. The normal force is controlled by the torque applied to the nut 22. Through the material choice, and surface coating or plating as appropriate for a particular application, of the input drive disk 14, traction balls 15, and traction plate 21, the frictional forces acting on the traction balls 15 against slippage on a surface of the input drive disk 14 and traction plate 21 are established. It will be appreciated that any suitable material and structural properties may be used for the input drive disk 14, traction balls 15, and traction plate 21 to obtain the desired movement, friction, and slippage characteristics for a particular application. It will also be appreciated that the torque applied to the nut 22 may also be set as appropriate to establish the frictional forces for a particular application.

If a torque is applied to the traction drive system through power supplied to the input drive disk 14 by the motor 20, or if a torque is applied to either arm segment 4 or arm segment 41, or any combination of the three, and the resulting tangential forces acting on the traction balls 15 do not exceed the frictional forces, the traction balls 15 will roll along surfaces of the input drive disk 14 and traction plate 21, and the input drive disk can drive the output drive shaft such that they can rotate with one another. In embodiments where arm segment 41 is fixed, the input drive disk can drive the traction plate 21 such that they can both rotate with respect to one another. The resulting effect is that the rotation of arm segment 41 or arm segment 4 is coupled to the rotation of the motor 20.

If, on the other hand, a torque is applied to the traction drive system through power supplied to the input drive disk 14 by the motor 20, or if a torque is applied to either arm segment 4 or arm segment 41, or any combination of the three, and the resulting tangential forces acting on the traction balls 15 do exceed the frictional forces, the input drive disk rotation will become decoupled from the output drive shaft rotation. In embodiments where arm segment 41 is fixed, the input drive disk rotation can become decoupled from the traction plate rotation. The resulting effect is that the rotation of arm segment 41 or arm segment 4 is decoupled from the rotation of the motor 20.

Figure 4:
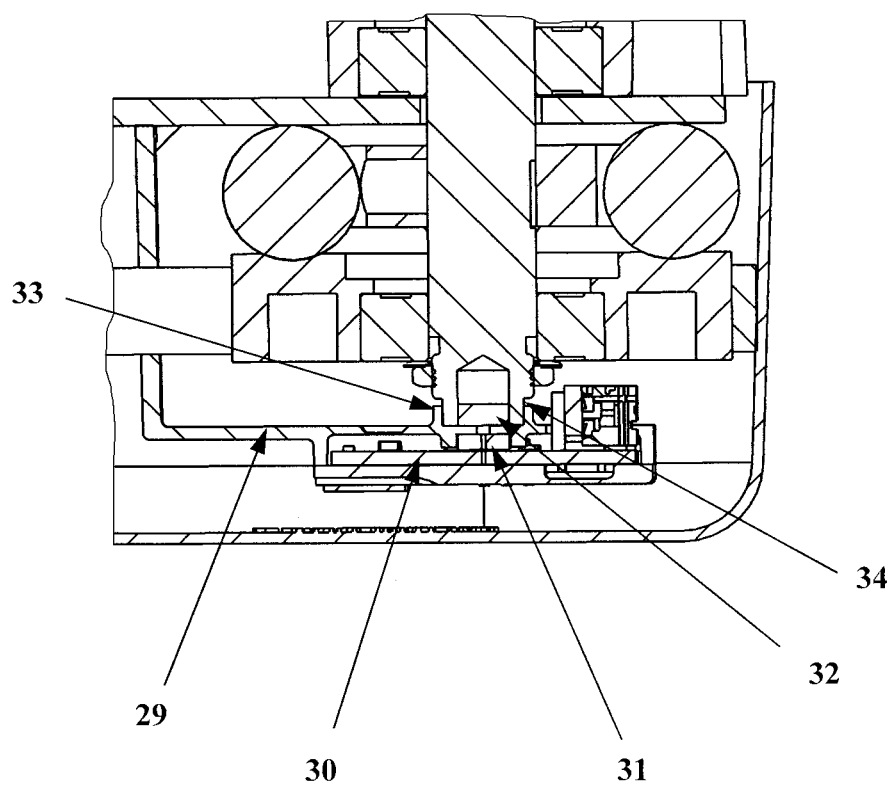
FIG. 4 is an enlarged fragmentary sectional view showing an absolute rotational position sensor system for a traction drive such as is shown in FIG. 1.

Referring to FIGS. 3 and 4, a mounting bracket 29 can hold an electronic circuit board 30. The circuit board 30 can be located within the bracket 29 so that a magnetically sensitive electronic component 31 can be positioned concentrically to an embossment with a counter-bored hole 33 included on the bracket 29. The counter-bored hole 33 engages an end 34 of the output drive shaft 13. The output drive shaft 13 can include an embedded permanent magnet 32. This arrangement locates the magnetically sensitive electronic component 31 concentrically and within proximity to the permanent magnet 32. With these components working together to create an absolute rotational position sensor system, a true absolute position feedback of an articulated robotic arm can be provided. The absolute position feedback allows high precision movement of an articulated robotic arm. Additionally, this absolute rotational position sensor system can allow a robotic arm to be programmed for single position calibration. For example, a program with a number of predefined positions can be loaded into a controller, such as a vending machine controller, and by orienting the robotic arm to single calibration position, the robotic arm can be automatically programmed to all predefined locations.

Figure 5A:
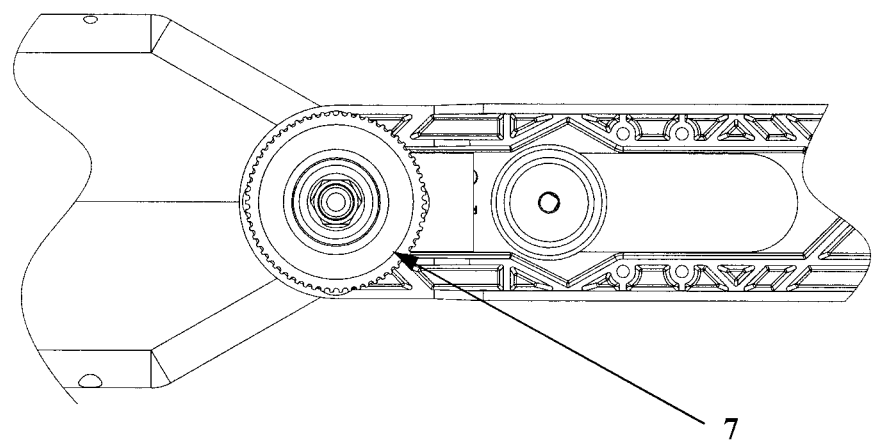
FIGS. 5A and 5B are plan views of an underside of the traction drive such as is shown in FIG. 1, FIG. 5B shown with an input drive disk removed.

Referring to FIG. 5A, an underside of the traction drive system 1 is shown with the mounting bracket 6 removed to show the bottom of the input drive disk 7.

Figure 5B:
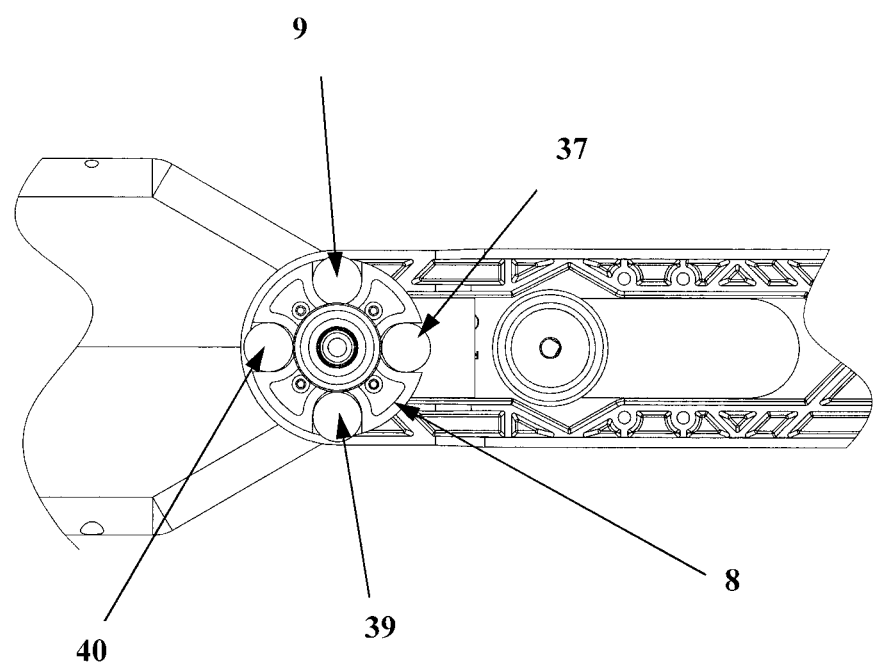

Similarly, the underside of the traction drive system 1 is shown in FIG. 5B with the input drive disk 7 also removed to show the traction balls 9, 37, 39, and 40 located between the four spokes of the spider 8. It will be appreciated that the underside of the traction drive system 2 is similarly structured as the traction drive system 1 shown in FIGS. 5A and 5B. It will also be appreciated that the spider can have any suitable shape and any suitable number of spokes to accommodate any suitable number of traction balls having any suitable size.

U.S. patent application Ser. Nos. 60/853,901, 60/857,282, 60/915,731, and 11/923,644 are incorporated by reference in their entirety herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A traction drive system for an articulated robotic arm comprising:
   an input drive disk;
   a spider disposed coaxially to the input drive disk, the spider having a plurality of spokes;
   a plurality of traction balls disposed between the spokes of the spider;
   a traction plate;
   an output drive shaft fixed to the spider and disposed coaxially to the input drive disk, said output drive shaft including an embedded permanent magnet;
   an adjustable clamping device disposed coaxially to said output drive shaft, wherein the adjustable clamping device is a nut threadably engaged with said output drive shaft and exerting a force on the input drive disk, the traction balls, and causing the traction balls to exert a force against the traction plate such that adjustment of the torque applied to said nut adjusts the force applied to said input drive disk, the traction balls and the traction plate; and
   a rotational position sensor system for providing rotational position feedback.

2. The traction drive system of claim 1 wherein the input drive disk transfers its rotational motion to the plurality of traction balls causing the plurality of traction balls to roll against the surface of the traction plate along a circular path.

3. The traction drive system of claim 1 wherein the input drive disk includes a circular slot to guide the traction balls along a circular path when the input drive disk is rotated.

4. The traction drive system of claim 1 wherein the output drive shaft or the traction plate is rotated by the input drive disk rotating to roll the plurality of traction balls between the input drive disk and the traction plate.

5. The traction drive system of claim 1 wherein the output drive shaft or the traction plate is rotated by the input drive disk when the input drive disk rotates to roll the plurality of traction balls between the input drive disk and the traction plate if tangential forces acting on the plurality traction balls through contact with the input drive disk and traction plate are less than frictional forces acting on the plurality of traction balls through contact with the input drive disk and traction plate.

6. The traction drive system of claim 1 wherein the output drive shaft and traction plate are not rotated by the input drive disk if tangential forces acting on the plurality of traction balls in contact with the input drive disk and traction plate exceed frictional forces acting on the plurality of traction balls in contact with the input drive disk and traction plate.

7. The traction drive system of claim 1 wherein rotational motion of the input drive disk is decoupled from rotational motion of the output drive shaft if a force exerted on the input drive disk or output drive shaft exceeds a threshold.

8. The traction drive system of claim 7 wherein the input drive disk is driven by a motor and the decoupling of the rotation motion of the output drive shaft rotation and the rotation motion of the input drive disk allows the output drive shaft to rotate independently from the motor.

9. The traction drive system of claim 1 wherein rotational motion of the input drive disk is decoupled from rotational motion of the traction plate if a force exerted on the input drive disk or traction plate exceeds a threshold.

10. The traction drive system of claim 1 wherein said permanent magnet is disposed coaxially to said output drive shaft and said rotational position sensor system includes an electronic circuit board with a magnetically sensitive electronic component positioned in proximity to the permanent magnet.

11. The traction drive system of claim 10 wherein a mounting bracket positions the electronic circuit board and magnetically sensitive electronic component in proximity to the permanent magnet.

12. The traction drive system of claim 11 wherein the mounting bracket includes an embossment with a counterbored hole that engages the output drive shaft.

13. The traction drive system of claim 12 wherein the embossment with the counterbored hole positions the magnetically sensitive electronic component in proximity to the permanent magnet such that the magnetically sensitive electronic component is positioned circumferentially to the permanent magnet.

14. The traction drive system of claim 1 wherein the adjustable clamping device is a nut threadably engaged with said output drive shaft and exerting a force on the input drive disk, the traction balls, and causing the traction balls to exert a force against the traction plate such that adjustment of the torque applied to said nut adjusts the force applied to said input drive disk, the traction balls and the traction plate.

15. A traction drive system for an articulated robotic arm comprising:
    an input drive disk;
    a spider disposed coaxially to the input drive disk, the spider having a plurality of spokes;
    a plurality of traction balls disposed between the spokes of the spider;
    a traction plate;
    an output drive shaft fixed to the spider and disposed coaxially to the input drive disk, said output drive shaft including an embedded permanent magnet disposed coaxially to said output drive shaft;
    a clamping device exerting a force on the input drive disk, the traction balls, and causing the traction balls to exert a force against the traction plate;
    a rotational position sensor system for providing rotational position feedback including an electronic circuit board with a magnetically sensitive electronic component positioned in proximity to the permanent magnet and which senses the absolute rotational position of said permanent magnet; and
    a controller programmed with a plurality of predefined positions corresponding to a plurality of positions of a distal end of said robotic arm.

16. The traction drive system of claim 15 wherein the adjustable clamping device is a nut threadably engaged with said output drive shaft and exerting a force on the input drive disk, the traction balls, and causing the traction balls to exert a force against the traction plate such that adjustment of the torque applied to said nut adjusts the force applied to said input drive disk, the traction balls and the traction plate.

17. The traction drive system of claim 15 wherein said permanent magnet is disposed coaxially to said output drive shaft and said rotational position sensor system includes an electronic circuit board with a magnetically sensitive electronic component positioned in proximity to the permanent magnet and wherein a mounting bracket positions the electronic circuit board and magnetically sensitive electronic component in proximity to the permanent magnet.

18. The traction drive system of claim 17 wherein the mounting bracket includes an embossment with a counterbored hole that engages the output drive shaft.

19. The traction drive system of claim 18 wherein the embossment with the counterbored hole positions the magnetically sensitive electronic component in proximity to the permanent magnet such that the magnetically sensitive electronic component is positioned circumferentially to the permanent magnet.

20. A traction drive system for an articulated robotic arm comprising: an input drive disk;
    a spider disposed coaxially to the input drive disk, the spider having a plurality of spokes;
    a plurality of traction balls disposed between the spokes of the spider;
    a traction plate;
    an output drive shaft fixed to the spider and disposed coaxially to the input drive disk, said output drive shaft including an embedded permanent magnet, wherein said permanent magnet is disposed coaxially to said output drive shaft;
    an adjustable clamping device disposed coaxially to said output drive shaft exerting a force on the input drive disk, the traction balls, and causing the traction balls to exert a force against the traction plate;
    a rotational position sensor system for providing rotational position feedback, wherein said rotational position sensor system includes an electronic circuit board with a magnetically sensitive electronic component positioned in proximity to the permanent magnet; and
    a mounting bracket wherein said mounting bracket includes an embossment with a counterbored hole that engages the output drive shaft and positions the electronic circuit board and magnetically sensitive electronic component in proximity to the permanent magnet.

21. The traction drive system of claim 20 wherein the embossment with the counterbored hole positions the magnetically sensitive electronic component in proximity to the permanent magnet such that the magnetically sensitive electronic component is positioned circumferentially to the permanent magnet.

22. The traction drive system of claim 20 wherein the adjustable clamping device is a nut threadably engaged with said output drive shaft and exerting a force on the input drive disk, the traction balls, and causing the traction balls to exert a force against the traction plate such that adjustment of the torque applied to said nut adjusts the force applied to said input drive disk, the traction balls and the traction plate.

* * * * *